United States Patent [19]

Kusakabe

[11] Patent Number: 5,105,700
[45] Date of Patent: Apr. 21, 1992

[54] TUBE CUTTING APPARATUS AND METHOD

[75] Inventor: Yukio Kusakabe, Kobe, Japan

[73] Assignee: Kusakabe Electric & Machinery Co., Ltd., Kobe, Japan

[21] Appl. No.: 492,093

[22] Filed: Mar. 12, 1990

[51] Int. Cl.[5] .............................................. B26D 1/56
[52] U.S. Cl. ...................................... 83/318; 83/320; 83/54
[58] Field of Search ................. 83/318, 319, 320, 310, 83/324, 54, 303

[56] References Cited

U.S. PATENT DOCUMENTS

| | | | |
|---|---|---|---|
| 4,149,438 | 4/1979 | Hori | 83/320 |
| 4,165,665 | 8/1979 | Shimizu et al. | 83/320 |
| 4,183,271 | 1/1980 | Martin | 83/324 |
| 4,329,899 | 5/1982 | Hori | 83/320 |
| 4,350,065 | 9/1982 | Hayashi et al. | 83/320 |
| 4,637,287 | 1/1987 | Kusakabe | 83/319 |

Primary Examiner—Mark Rosenbaum
Assistant Examiner—Scott A. Smith
Attorney, Agent, or Firm—Baker & McKenzie

[57] ABSTRACT

An apparatus for cutting tubing to predetermined lengths while the tubing is being produced. The apparatus includes a cutting or shearing assembly comprising a die-set which having a cutting blade. The die-set is translated to a velocity which matches the line velocity of the tubing as it is produced. A press assembly acutates the cutting blade. The apparatus has a controller which calculates the maximum cutting time available, and the press assembly is instructed to rotate at the slowest rate possible, depending upon the line velocity. By causing the cutting blade to move as slowly as possible through the tubing, the life of the cutting blade is prolonged.

4 Claims, 2 Drawing Sheets

TUBE CUTTING APPARATUS AND METHOD

BACKGROUND AND SUMMARY OF THE INVENTION

The present invention relates to cutoff machines used in the continuous production of tubing. In general, tube and pipe mills employ a variety of cutoff machines, including press cut (single cutoff or double cutoff), rotary cutoff, metal saw cutoff, cutting tool cutoff, and plasma cutoff systems. The present invention relates primarily to press cutoff systems, which are used for high speed mills which produce medium and small diameter tubing.

U.S. Pat. No. 4,637,287, assigned to Kusakabe Electric and Machinery Co., Ltd., is an example of a cutoff device in which the present invention is applicable. The press cutoff machines shown in the '287 patent includes a rotatable press assembly, and a vertically actuated cutoff blade. The cutoff blade is carried by a die set which is accelerated horizontally into synchronous movement with the continuously produced tubing. When the die set has matched the velocity of the tubing being produced, the vertically actuated cutting blade is forced through the tubing to achieve the cutting operation. Once the cut has been made, the cutting blade is lifted and the die set is decelerated.

In the continuous production of tubing, the useful life of critical components, such as the cutoff cutting blade, is extremely important. In order to change a cutoff cutting blade, the entire tube manufacturing line must be stopped. Even in small diameter mills, the time required to change the cutting blade results in significant loss in productive time. Therefore, it is important to maximize to the fullest extent possible the useful life of cutoff cutting blades.

Cutting blade life can be lengthened if the temperature at which cuts are made is minimized. One technique for keeping the temperature of a cutting blade lower is to make cuts at a slower speed. The reduced cutting speed or longer cutting time results in fewer cutting blade replacements.

Traditionally, cutting stations in a tube producing mill were designed to use a cutting speed (vertical cutting blade velocity) which was merely sufficient to accomplish cutting of all sizes of tubes to be produced. No particular attention was paid to the speed of the cutting blade, and no attempts were made to vary it. By varying the speed of cutting in order to take advantage of the full stroke of the cutting assembly, the blade life is improved and the cutting force is better distributed over the press assembly.

Therefore, it is an object of the present invention to provide a cutoff machine which reduces the number of blade replacements.

Another object of the invention is to provide a cutoff machine which reduces the heat transferred to a cutting blade.

Still another object of the invention is to provide a cutoff machine which maximizes the time during which a cut is made.

Yet another object of the invention is to provide a cutoff machine which allows cuts to be made at lower temperature without sacrificing mill efficiency.

These and other objects of the invention are achieved with a cutoff machine which includes a frame with cutting and press assemblies coupled with each other. The cutting assembly is translatable to a velocity which matches that of the tubing to be cut. After the cutting assembly has reached a velocity which matches the tubing velocity, the press assembly causes the cutting blade to shear the tubing. In the device of the present invention, the speed at which the cutting blade passes through the tubing is determined in such a way as to fully maximize the translational stroke of the cutting assembly. This is accomplished by monitoring the tubing velocity and calculating a press assembly angular velocity which will cause completion of the cut at a point in time which takes full advantage of the time which is required in order to return the cutting assembly to a position from which a subsequent cut can be made.

DETAILED DESCRIPTION OF THE INVENTION

Figure 1:
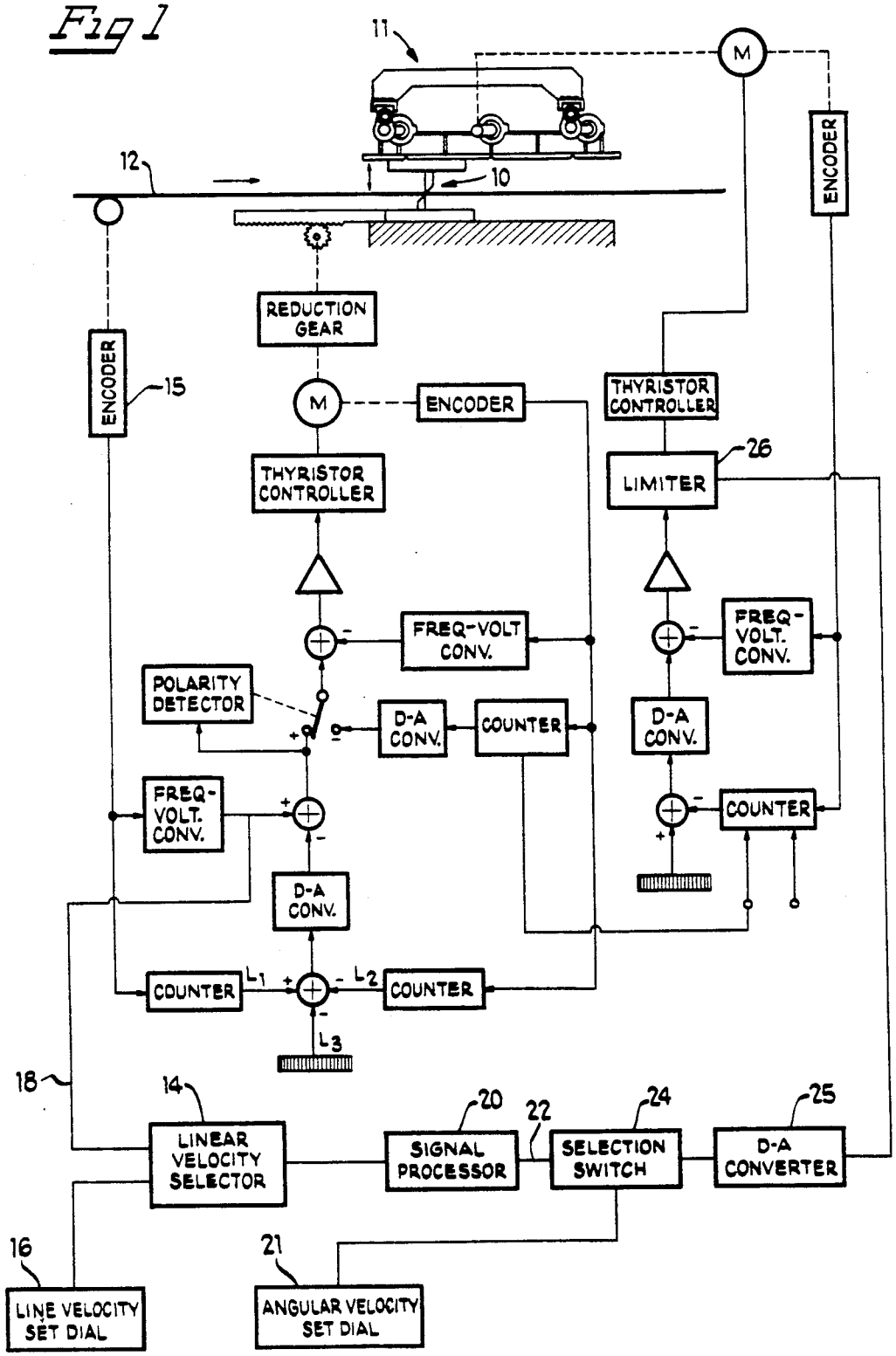
FIG. 1 is a schematic diagram of the controls used in the present invention.

The block diagram of FIG. 1 shows the various control components used in the present invention. In FIG. 1, a reciprocating traveling shear or cutting assembly 10 engages a continuous length of tubing 12. The cutting assembly 10 is shown schematically. For further details of a typical cutting assembly, reference should be made to U.S. Pat. No. 4,637,287, which is incorporated herein by reference. Similarly, the controls shown in FIG. 1 are, in large part, similar to the control components shown and described in U.S. Pat. No. 4,350,065, which is also incorporated herein by reference.

The present invention includes an improved control feature for use in a system like the one shown in U.S. Pat. No. 4,350,065. The linear velocity selector 14 chooses the greater of the line velocity setting or the actual tubing velocity (or line speed) as monitored by the rotary encoder 15.

The line velocity set dial 16 and a signal 18 corresponding to the actual measured tubing velocity are each fed into the linear velocity selector 14. The greater of these two velocities is fed into the signal processor 20, which calculates a theoretical or ideal angular velocity for the press assembly 11. The velocity selector 14 provides the system with an element of safety. By taking the larger of the dial settings or the actual velocity, use of a cutting speed which is too slow is prevented. Too slow of a cutting speed could damage the cutting assembly because relative movement of the tubing and the cutting assembly would begin prior to completion of the cut.

The signal processor 20 generates a digital signal 22 which is fed through an angular velocity selector switch 24. Also fed to the selector switch 24 is an angular velocity setting, which allows an operator to manually control the angular velocity of the press assembly 11, and override the signal 22. The angular velocity selector, therefore, allows for either manual or automatic selection of the angular velocity for the press assembly 11. The angular velocity selection switch sends a signal to a digital to analog converter 25, which feeds an analog signal to a limiter 26. The limiter 26 prevents the press assembly from exceeding the angular velocity as calculated by the signal processor 20 or as set by the angular velocity set dial 21.

Figure 2:
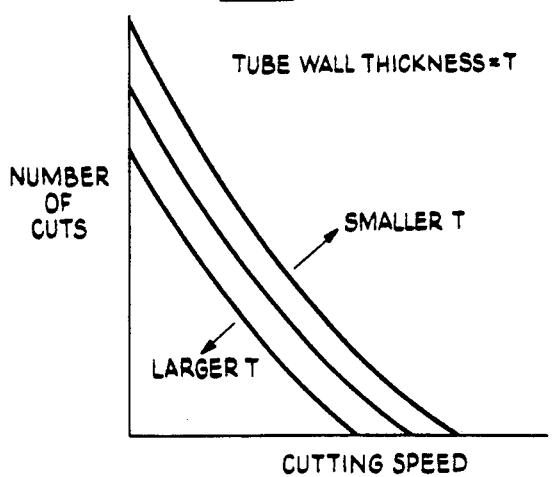
FIG. 2 is a graph showing the general relationship between cutting blade life and cutting speed.

FIG. 2 shows the general relationship between cutting blade life and cutting speed for various thicknesses of tubing. As shown in the graph of FIG. 2, increased cutting speed substantially reduces the number of cuts which can be made with a blade. As can be seen in the graph, this general relationship applies to both thick and thin walled tubing. It is, therefore, advantageous to reduce the speed at which a cutting blade passes through a tube section, as long as such reductions do not also reduce overall efficiency of the tubing mill.

Figure 3:
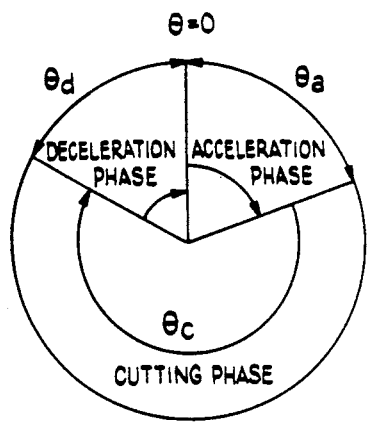
FIG. 3 is a diagram showing the positions of the rotating press assembly of the present invention.

FIG. 3 is a diagram showing a complete cycle of the press assembly 11, including the acceleration, cutting and deceleration phases. The diagram of FIG. 3 is somewhat idealized in that there is no overlap between the acceleration and deceleration phases. If a larger cutting phase is required, the overlapping of the acceleration phases and deceleration phases may require that the press be reversed slightly after deceleration in order to provide sufficient angular scope for acceleration in the clockwise direction. The angular extent during which the press assembly accelerates and decelerates are designated by the symbols a and d respectively. Similarly, the angular extent during which the cutting blade is performing a cutting operation is designated with the symbol.

Figure 4:
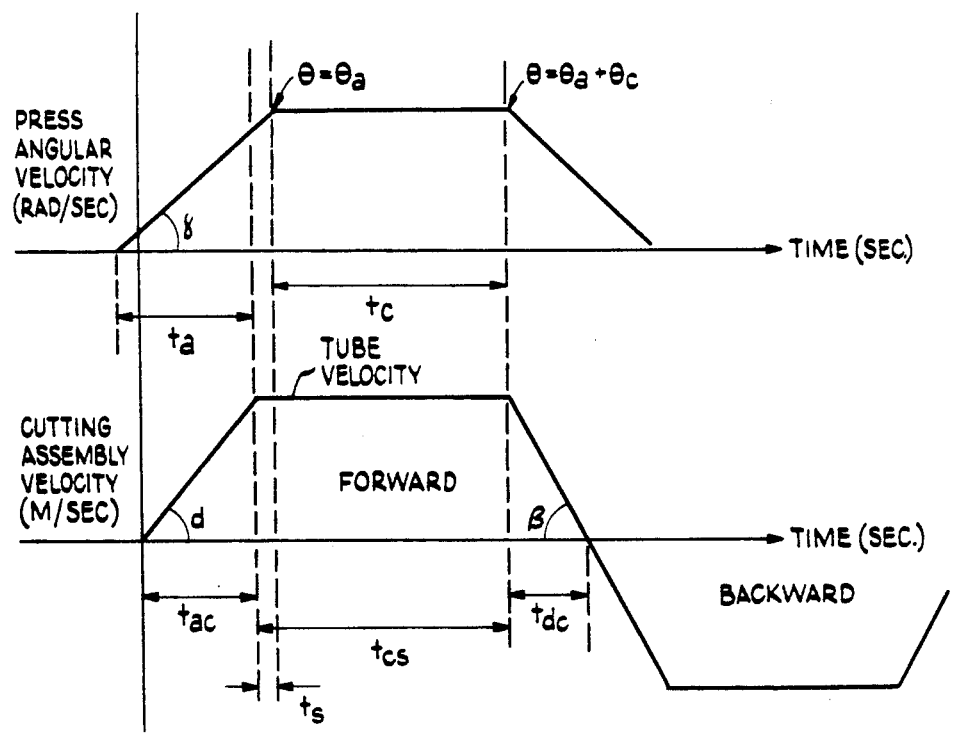
FIG. 4 shows two time related graphs describing the relationship between the angular velocity of the press assembly and the translational velocity of the cutting assembly of the present invention.

FIG. 4 shows a timing diagram of both the angular motion of the press assembly and the translational movement of the cutting assembly. The upper portion of FIG. 4 shows the various changes in angular velocity of the press assembly over time. Similarly, the lower portion of FIG. 4 shows the changes in the cutting assembly velocity over time. Since the acceleration and deceleration rates, $\alpha$ and $\beta$, respectively, associated with the cutting assembly are substantially constant, the appropriate or maximum cutting time, $t_c$ can be calculated as follows:

$$t_c = \frac{S}{v} - \left(\frac{1}{\alpha} + \frac{1}{\beta}\right) \times \frac{v}{2}$$

Where:
S = the translational stroke of the cutting assembly (m)
$v$ = the line speed, the greater of set or actual (m/s)
$\alpha$ = cutting assembly acceleration rate (m/s$^2$)
$\beta$ = cutting assembly deceleration rate (m/s$^2$)

Since the press assembly acceleration rate $\gamma$ is substantially constant, depending upon the motor used, the angular velocity calculated in accordance with the present invention can be determined from the following:

$$\omega = \gamma \left\{ \left(t_c + \frac{2\theta_a}{\omega_{max}}\right) + \sqrt{\left(t_c + \frac{2\theta_a}{\omega_{max}}\right)^2 - \frac{2(\theta_a + \theta_c)}{\gamma}} \right\}$$

Where:
$\gamma$ = press assembly acceleration rate (rad/sec)
$t_c$ = cutting time (sec)

$\omega_{max}$ = the angular velocity at maximum line speed
$\theta_a$ = angle during which press assembly accelerates (rad)
$\theta_c$ = angle during which cutting take place (rad)

In FIG. 4, the various symbols and their subscripts have the following meanings:
$t_a$ = time for the press assembly to rotationally accelerate
$t_c$ = cutting time
$t_{ac}$ = time for cutting assembly to translationally accelerate
$t_{cs}$ = time during which the cutting assembly and the tubing are translating synchronously
$t_{dc}$ = time for cutting assembly to translationally decelerate
$t_s$ = the difference in time between the point when the cutting assembly and tubing first start translating synchronously and the point when cutting begins As can be appreciated from studying FIG. 4, the maximum available cutting time, $\omega_{max}$, is a function of the translational stroke of the cutting assembly, the line speed, $v$ and the acceleration and deceleration rates of the cutting assembly motor 17 (See FIG. 1).

By programming the controls for the cutting station shown in FIG. 1, in such a way as to limit the angular velocity of the press assembly to an angular velocity which is calculated on the basis of the maximum available cutting time, the life of the cutting blade used in the cutting station can be maximized.

While a specific embodiment of the invention has been shown and described, it will be apparent to those skilled in the art that numerous alternatives, modifications, and variations of the embodiment shown can be made without departing from the spirit and scope of the appended claims.

I claim:

1. An apparatus for use in cutting tubing comprising:
   a frame,
   a cutting assembly carried by said frame, said cutting assembly including a cutting blade,
   cutting assembly drive means for moving said cutting assembly synchronously with said tubing, movement of said cutting assembly in a direction of movement of said tubing defining a stroke,
   a press assembly carried by said frame and coupled with said cutting assembly,
   actuating means for causing rotative movement of said press assembly and actuation of said cutting blade in a cutting direction transverse to said direction of movement of said tubing,
   movement of said cutting assembly drive means and said actuating means being independently controllable,
   control means for controlling and coordinating movement of said cutting assembly along said stroke with actuation of said cutting blade so as to take maximum advantage of time available to cut said tubing,
   said control means including signal processing means for calculating a minimum angular velocity for said actuating means based upon a maximum available cutting time, whereby the speed of said cutting blade is minimized.

2. An apparatus for cutting tubing in accordance with claim 1, wherein:
   said control means includes limit means for preventing said actuating means from rotating at an angular velocity greater than said minimum angular velocity.

3. An apparatus for cutting tubing in accordance with claim 1 wherein:
said apparatus includes a line speed setting means for setting movement of said tubing to a set velocity, and said apparatus further includes means for measuring actual tube velocity, and said signal processing means is capable of calculating said maximum angular velocity on the basis of the greater of said set velocity and said actual tube velocity.

4. An apparatus for cutting tubing in accordance with claim 3 wherein:
said apparatus includes an actuating means control switch for manually setting an angular velocity of said actuating means independent of said tubing velocity.

* * * * *